UNITED STATES PATENT OFFICE 2,267,068

PROCESS FOR PRODUCING ETHERS OF THIOAMMELINE

Werner Zerweck, Frankfort-on-the-Main-Fechenheim, and Eduard Gofferjé, Frankfort-on-the-Main, Germany, assignors, by mesne assignments, to General Aniline & Film Corporation, New York, N. Y., a corporation of Delaware No Drawing. Application March 2, 1940, Serial No. 321,898. In Germany March 4, 1939

2 Claims. (Cl. 260—248)

Our present invention relates to a process for producing ethers of thioammeline of the general formula:

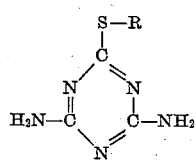

wherein R stands for a member of the group consisting of alkyl, cycloalkyl, aralkyl and aryl groups.

The process consists in treating thioammeline with an alkylating, cycloalkylating, aralkylating or arylating agent in an alkaline medium. This reaction can be carried out in a smooth reaction with an excellent yield, a fact which could not be foreseen, since Rathke (Ber. vol. 20, page 1062 et seq.) could not succeed; the primarily formed mercaptides being decomposed in the moment of formation, so that he could only obtain a mixture of alkylmercaptans and ammeline.

In contradistinction thereto, according to the present process by working in an alkaline medium the reaction can be stopped on the formation of thioethers, so that generally by acting on thioammeline with an alkylating, cycloalkylating, aralkylating or arylating agent the corresponding thioethers are obtained with an almost theoretical yield. Di-thioethers are likewise obtainable. For instance by acting with ethylene bromide both bromine atoms are replaced by the mercapto radicle with the formation of the di-thioammeline-ethylene ether, a fact which is again in contradistinction to the publication of Rathke (loc. cit.), who could only replace one bromine atom, whereas the other one reacted with one imino group with ring closure.

The present ethers of thioammeline are mostly colorless crystalline powders, they are partly described in literature. According to A. W. Hofmann, (Ber. vol. 18, page 2755) they are formed by acting with alcoholic ammonia on sulfocyanuric acid alkylesters. In this case only a mixture of alkylthioammelines and considerable quantities of di-alkylmercapto-aminotriazines and melamine is formed, from which the desired product can only be isolated in a troublesome manner with a small yield.

The ethers of thioammeline are important intermediates for the manufacture of valuable artificial resins and assistants in textile industry.

In order to further illustrate our invention the following examples are given, the parts being by weight and all temperatures in degrees centigrade.

Example 1

143 parts of thioammeline are dissolved at about 30 to 40° in about 1800 parts of water and 120 parts of a caustic soda solution of 40° Bé. Then 53 parts of anhydrous sodium carbonate and, while stirring and slightly cooling, 126 parts of dimethylsulfate are slowly added. The reaction mass is stirred until the colorless reaction product separates entirely. It is isolated and dried.

Then with an excellent yield the thioammeline-methyl ether is obtained in a practically sufficient degree of purity. When recrystallized from ethyl alcohol it melts at 267 to 268°.

In the same manner by acting with diethyl sulfate on thioammeline the ethyl ether thereof which melts at 173 to 174° is obtained.

Example 2

To a solution of 143 parts of thioammeline in about 1800 parts of water and 240 parts of a caustic soda solution of 40° Bé. at 20 to 25° while strongly stirring 109 parts of ethylbromide are added. After having stirred the reaction mixture for some hours the formed thioammeline ethylether, which is obtained as a colorless powder with an almost theoretical yield, is isolated. When recrystallized from alcohol it melts at 173 to 174°.

In the same manner the n-butylether of thioammeline is obtained being a white powder of 147 to 148° melting point and the sec.-butylether of the formula:

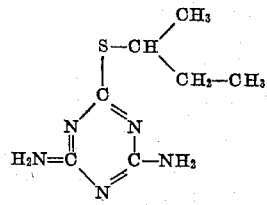

being likewise a white powder of 184 to 185° melting point; the isobutylether being a white powder melting at 177 to 179°.

When acting with cyclohexylbromide on thioammeline-sodium the cyclohexylether of the formula:

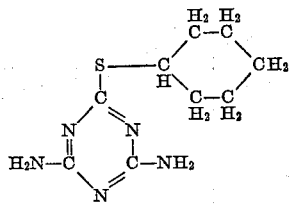

is obtained, being a white crystalline powder of 239-240° melting point.

*Example 3*

Into a solution of 214 parts of thioammeline in about 2700 parts of water and 180 parts of a caustic soda solution of 40° Bé. while strongly stirring at 30 to 35° 189 parts of benzylchloride are added. After having stirred the mixture for some hours the thioammeline benzylether, which has been formed as a colorless powder with an almost theoretical yield, is isolated. When recrystallized from alcohol it melts at 166 to 167°.

*Example 4*

In the same manner as described in the foregoing examples a solution of 143 parts of thioammeline in about 1800 parts of water and 240 parts of a caustic soda solution of 40° Bé. is decomposed with 94 parts of ethylene bromide at 35 to 40°.

The isolated reaction product may be purified by recrystallization in acetic acid of 50% strength, and the acetate, thus formed, may be decomposed by the action of a caustic soda solution. The di-thioammeline-ethyleneether of the formula:

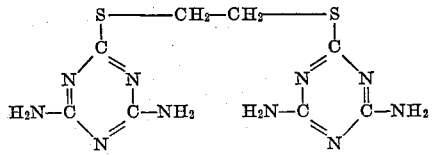

thus obtained is a colorless powder melting at 264°. It is not identical with the product of Rathke (Ber. d. Deutschen Chem. Ges. vol. 20, page 1063) obtained by acting with ethylene bromide on thioammeline in an alcoholic solution.

*Example 5*

To a solution of 165 parts of thioammeline sodium salt in about 1800 parts of water and 120 parts of a caustic soda solution of 40° Bé. slowly at 90 to 95° 203 parts of 2.4-dinitro-chlorobenzene are added and the reaction mixture is held at about 80° for some hours. The reaction product, separating as light yellow crystals, is filtered off at 80° C., washed out with a warmed dilute caustic soda solution, then with water until a neutral reaction and dried. The thioammeline dinitro phenylether of the formula:

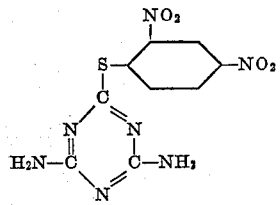

melts at 243° C.

We claim:

1. Process for producing ethers of thioammeline of the general formula:

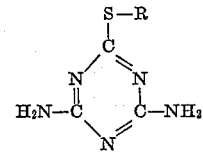

wherein R stands for a member of the group consisting of alkyl, cycloalkyl, aralkyl and aryl groups, which process consists in treating thioammeline in an alkaline medium with a member of the group consisting of an alkylating, cycloalkylating, aralkylating and arylating agent.

2. Process for producing ethers of thioammeline of the general formula:

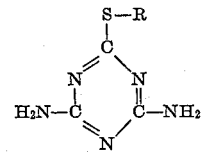

wherein R stands for a member of the group consisting of alkyl, cycloalkyl, aralkyl, and aryl groups, which process consists in treating thioammeline in an alkaline medium with a member of the group consisting of alkyl, cycloalkyl, aralkyl and aryl halides.

WERNER ZERWECK.
EDUARD GOFFERJÉ.